Aug. 30, 1966  Y. HOLBITZ  3,269,398
CONVEX TENTS

Filed Oct. 14, 1963  3 Sheets-Sheet 1

INVENTOR.
YEHUDA HOLBITZ
BY Mullin & Kaufman

Aug. 30, 1966          Y. HOLBITZ          3,269,398
                       CONVEX TENTS
Filed Oct. 14, 1963                    3 Sheets-Sheet 2

INVENTOR.
YEHUDA HOLBITZ
BY
Mullin & Kaufman

Aug. 30, 1966     Y. HOLBITZ     3,269,398
CONVEX TENTS
Filed Oct. 14, 1963                            3 Sheets-Sheet 3
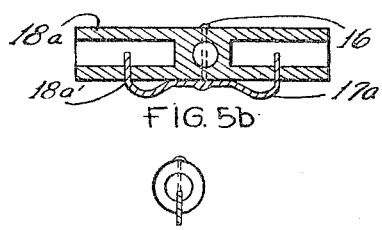
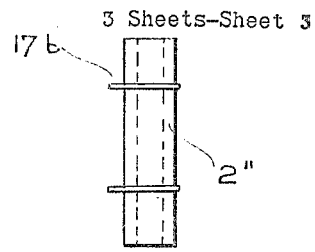
FIG. 6                      FIG 7a
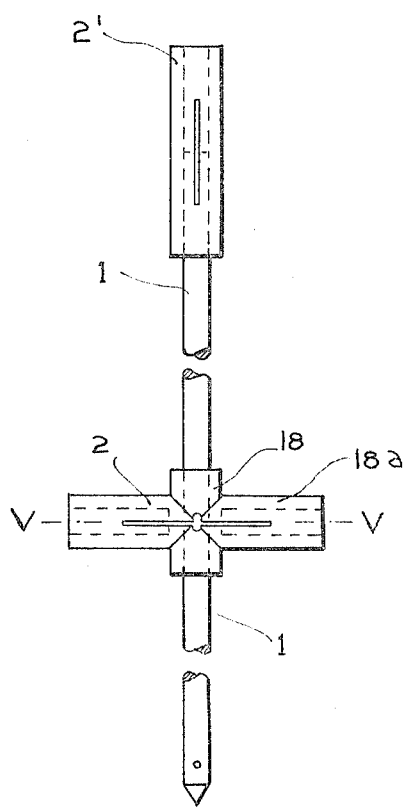
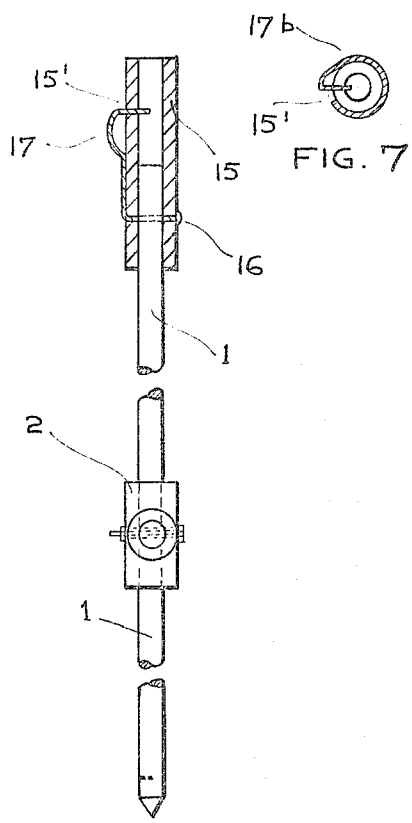
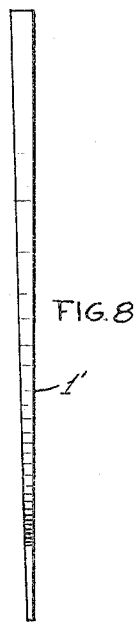
FIG. 5            FIG. 5a
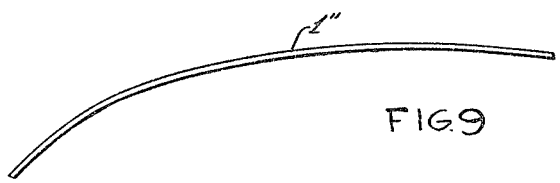
FIG. 9
INVENTOR.
YEHUDA HOLBITZ
BY *Mullin & Kaufman* ns
3,269,398
CONVEX TENTS
Yehuda Holbitz, 7 Hatamar, Tel Aviv, Israel
Filed Oct. 14, 1963, Ser. No. 315,757
Claims priority, application Israel, Oct. 17, 1962,
18,087
12 Claims. (Cl. 135—3)

The present invention concerns convex tents, a term which for the purpose of this invention includes any type of curved structure covered by material, such as a hut, shed, display chamber, awning or shelter and the like, in any kind of convex form, i.e. surface of revolution, such as a sphere, ellipsoid, paraboloid, conoid, cylindroid or any part or combination of these forms including domes and cupolas.

Convex tents consist of a framework of a plurality of spaced curved members which are held in their spaced relation by long, straight stiffening members fastened between the curved members. After the frame has been constructed, the material, such as tarpaulin, is stretched between and is fastened to the members. This type of construction is cumbersome and time consuming.

It is the object of the present invention to provide a convex tent, as above defined, which can be easily and quickly erected and collapsed and which is easily transportable in the collapsed state.

The invention consists in a convex tent, as hereinbefore defined, comprising a plurality of elongated resilient primary members anchored in a bowed condition at their two ends, and a plurality of elongated resilient auxiliary members fixed in a bowed condition to said primary members, and flexible material of the shape of the tent attached to the primary members.

The internal stresses of the resilient members, their anchorage and the shape of the material impart the required form and necessary stability to the tent.

The members may be solid or hollow resilient metal rods of any profile and may be either of one piece or of several sections joined by a connector. The members may likewise be made of a resilient plastic or organic material.

In one embodiment of the invention the rods have a reduced cross-section towards both their ends according to predetermined calculation, in order to impart to the rod a definite shape, e.g. an ellipse of predetermined dimensions, when it is bowed and the ends are anchored. Or, if desired, the ends of the rod may be bent initially and permanently for the same purpose.

The covering material may be canvas or other organic material, or plastic material such as transparent, translucent or opaque polyethylene, or any other flexible material. Windows and doors may be provided in the material as desired.

In another embodiment of the invention, the ends of the primary members are anchored in the ground.

In still another embodiment of the invention the ends of the members are anchored in a plate connector.

In still a further embodiment of the invention the ends of the primary members are anchored by being tied to each other.

The invention is illustrated, by way of example only, in the accompanying drawings, in which:

FIG. 5 is a plan view showing two types of sleeve connectors according to the invention.

FIG. 5a is a side elevation thereof, partly in section.

FIG. 5b is a section thereof taken on line V—V of FIG. 5.

FIG. 6 shows an end of a straight sleeve connector.

FIGS. 7 and 7a are respectively, an elevation and a plan view of a second embodiment of a sleeve connector.

FIG. 8 shows a modified form of a primary member in a plan view.

FIG. 9 shows another modified form of a primary member.

Figure 1:
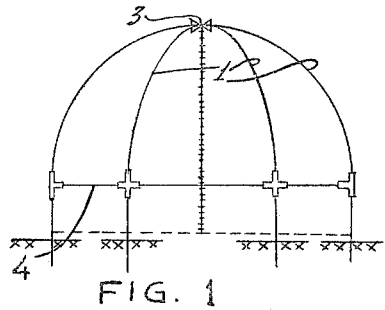
FIGS. 1, 1a and 1b show, respectively, a front elevation, side elevation, and plan view of a tent according to the one embodiment of the invention.
Figure 1A:
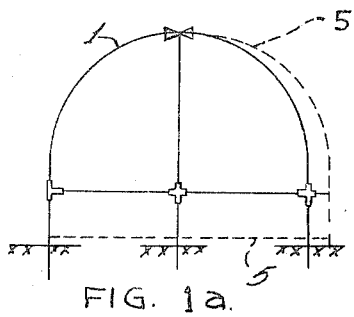
Figure 1B:
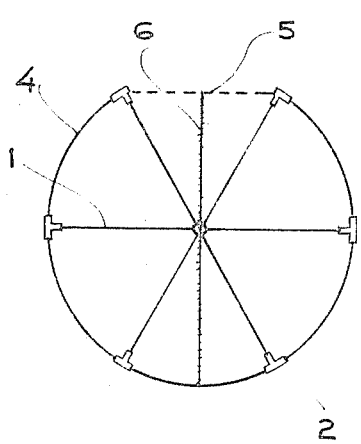

The tent as shown in FIGS. 1, 1a, 1b is of substantially semi-spherical shape and comprises three resilient primary members 1 whose ends have been anchored in the ground in a bowed condition of the members. Each member 1 is composed of several sections, the connection of these sections near the bottom of the members being effected by cross sleeve-connectors 2 of the kind which will be described hereinafter with reference to FIGS. 5 and 6. The centers of the members 1 are all connected to a plate connector 3 of the kind which will be described hereinafter with reference to FIG. 4. Near the ends of the primary members 1 resilient auxiliary members 4 are fixed by having their ends inserted in a bowed condition of the members 4 into the cross sleeve-connector 2. The whole framework of members 1 and 4 is covered by material 5 indicated by dotted lines, the material 5 being attached to the primary members 1. A zip fastener, indicated at 6 is provided across the tent for a purpose which will become clear hereinafter.

Figure 4B:
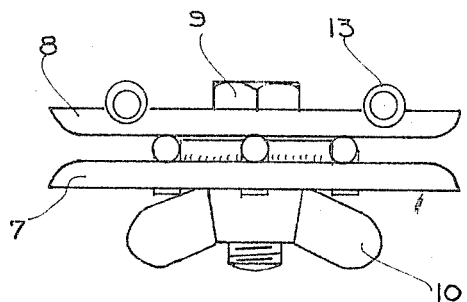
FIG. 4b is an elevation thereof.
Figure 4A:
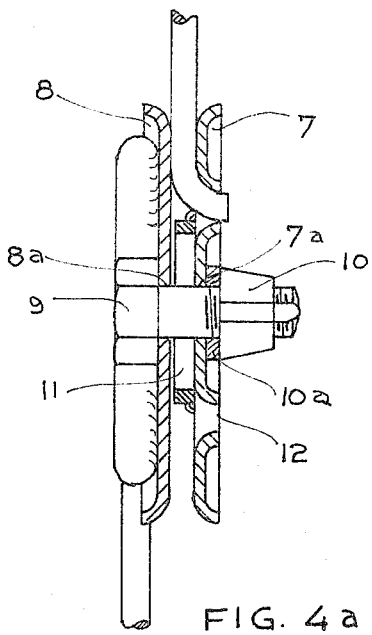
FIG. 4a is a section thereof, taken on line IV—IV of FIG. 4.
Figure 4:
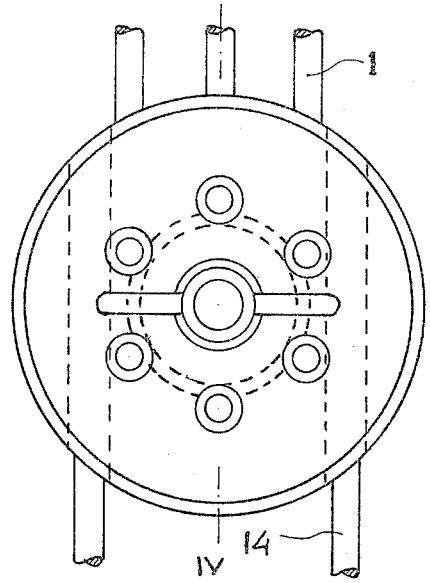
FIG. 4 is a plan view of a plate connector according to the invention.

Reference is made now to FIGS. 4, 4a, 4b in which the plate connector 3 is shown in greater detail. This connector is constituted by two dished plates 7, 8 their outer flanges facing outwardly. Each plate 7, 8 has a central aperture 7a, 8a through which a bolt 9 extends, the bolt being tightened by a wing nut 10, with the interposition of a member 10a. A spacer ring 11 of a height slightly smaller than the diameter of members 1 is fixed to plate 7 to hold the plate at a distance from each other. Plate 7 is further provided with six co-centric equi-angularly spaced apertures 12 of a diameter equal to that of the ends of members 1, which ends are slightly bent out of their planes. In the example shown in FIG. 4 only three sections of members 1 are inserted in three apertures 12. For transportation purposes the nut 10 is loosened so that the members 1 may be turned to lie substantially parallel with each other, whereafter the nut 10 is again tightened. When erecting a tent, the nut 10 is loosened, whereby it is possible to turn the members 1 into the desired positions, a tightening of the screw 10 fixing these positions.

Two parallel sleeves 13 are provided on the outside of plate 8 symmetrically arranged relative the diameter. These sleeves house stakes 14 indicated in dash-dotted lines in the case where the plate connector 3 is to be fixed to the ground in certain types of tents as will be described hereinafter.

Referring now to FIGS. 5 and 6, there is shown in the upper part of FIGS. 5 and 5a a straight sleeve connector 2' to be used for the tent according to the invention. It comprises a sleeve 15 which is fixed to a section of a member 1 by having a pin 16 extend diametrically through the sleeve 15 and the member 1, the head of pin being riveted to the former. A hook-shaped spring 17 is fixed with one end to pin 16, its other free end extending through aperture 15' in the wall of sleeve 15 into the interior thereof. When a section of a member 1 is to be attached to the free end of the sleeve connector 2', the free end of spring 17 is removed from aperture 15' by means of a suitable tool being wedged under the curved part of the spring, a further section of a member 1 (not shown) whose end is provided with a transverse aperture or with a peripheral groove is inserted into the free end of sleeve 15 and spring 17 is allowed to snap back into aperture 15', whereby it engages the said transverse aperture or groove.

The cross sleeve connector 2 shown in the lower part of FIGS. 5, 5a and in FIG. 5b comprises a short vertically extending sleeve 18 and integral transverse sleeves 18a, the connector 2 being attached to the member 1 which extends through the sleeve 18 by means of a pin 16. A spring 17a is fixed with its center to pin 16, its free ends being bent into hook-like shape and extending into apertures 18a' of sleeves 18a on either side of sleeve 18. The sleeves 18a are destined to house the ends of auxiliary members 4 (not shown) which are provided with peripheral grooves or apertures for the ends of spring 17a. In this manner the auxiliary members 4 are fixed to members 1.

In the modification of the sleeve connector 2" shown in FIGS. 7, 7a, the straight spring 17 is replaced by an annular spring 17b resting on the sleeve, one of the ends of said spring being bent to penetrate through an aperture 15' in the sleeve into its interior.

Returning now to FIGS. 1, 1a, 1b, the tent here illustrated is disassembled and folded in the following manner: At first the zip fastener 6 is opened. Then the auxiliary members 4 are removed from the sleeve connectors 4. Thereafter, the plate connector 3 is opened by loosening the nut 10 and the members 1 are lifted from their anchorage in the ground. Now these members are swung sideways, i.e. two of the members are swung until they lie parallel with the third member, care being taken that the material 5 is folded properly between the members. If the tent is large, the members 1, which are constituted by a large number of sections are disconnected and disassembled into these sections so that they may be conveniently carried together with the folded material.

The erection of the tent illustrated in FIG. 1 is effected in a reverse manner.

Figure 2B:
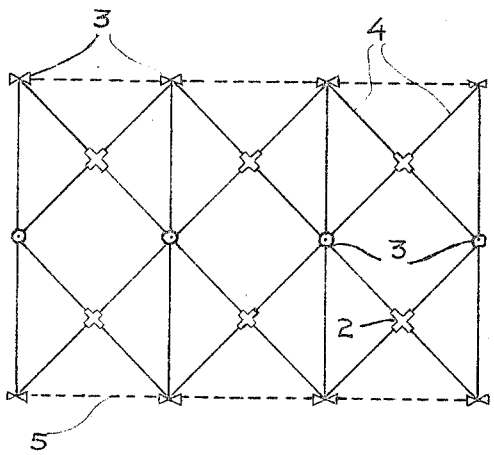
FIGS. 2, 2a and 2b, show, respectively, similar views of a tent according to another embodiment of the invention.
Figure 2A:
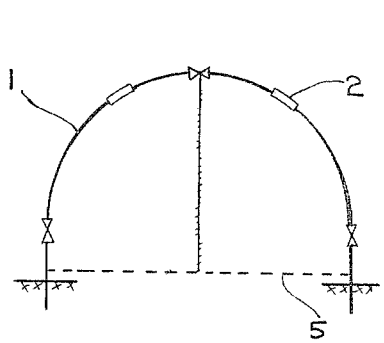
Figure 2:
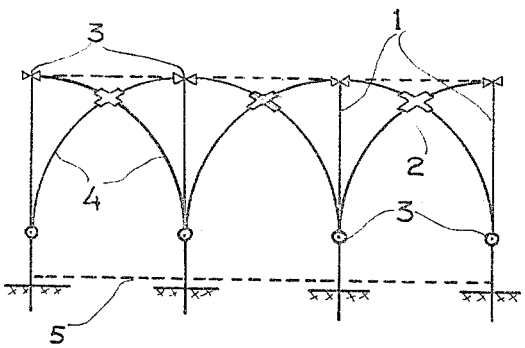

FIG. 2 shows a different type of tent which is constituted by four bowed primary members 1 anchored to the ground and by two pairs of crossed auxiliary members 4 disposed in the bowed condition between two adjacent primary members, plate connectors 3 being used for the connection of auxiliary members to the primary members, while sleeve-connectors 2 are used to connect the auxiliary members to each other.

Figure 3:
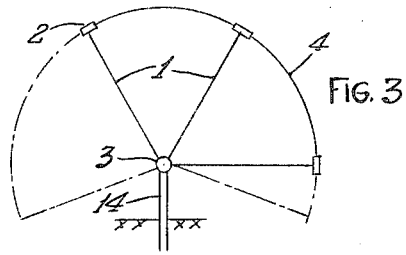
FIGS. 3, 3a and 3b, show, respectively, similar views of a sun shade or wind breaker according to a further embodiment of the invention.
Figure 3A:
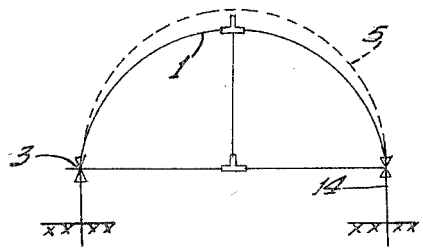
Figure 3B:
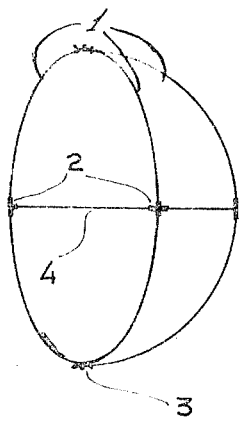

The tent, which in this instance serves as a sun shade or the like shelter illustrated in FIGS. 3, 3a and 3b comprises three primary members 1 anchored on either side to a plate connector 3 which by means of stakes 14 have been anchored to the ground. Two auxiliary members 4 are connected between primary members 1 by means of sleeve connectors 2. The shade is covered by material indicated by the dotted line 5. By loosening screw 10 of the plate connector 3, the position of plates 7 and 8 relative each other may be changed so that the sun shade may assume any of the positions indicated in dash-dotted lines.

While no windows or doors have been shown in any of the FIGS. 1–3, windows or doors may be made in the material in any convenient position by suitably cutting the material and providing either zip-fastened or button-down covering material for the apertures made.

In order to impart to the primary and/or auxiliary members a definite predetermined shape, e.g. a segment of an ellipse, the ends of these members may be bent initially into a predetermined shape. This is shown in FIG. 9 which shows in plan a primary member 1' in its original shape, i.e. before it is anchored to form one of the stays for a tent. This member 1' has been given an initial bend according to predetermined calculations, so that when erected into position a predetermined bowed shape is obtained. In FIG. 8 the member 1" is of larger diameter at its center than at its ends, and tapers from said center towards both ends according to predetermined calculation, so that when said member is erected it receives the desired predetermined shape.

The members or their sections consist of solid or hollow rods of any suitable profile.

It is obvious that the shapes and sizes of tents constituted by the primary and auxiliary resilient members according to the invention is substantially without limit.

In order to impart to the primary and/or auxiliary members a definite predetermined shape, e.g. a section of an ellipse, the ends of the members may be bent initially into a predetermined position, or the cross-section of the members may be reduced from the centers of the members towards their ends. The members or their sections consist of solid or hollow rods of any suitable profile.

The number of apertures in the connector plate 3 may be less or more than six, as required by the dimensions of the tent. Instead of clamped sleeve connectors, threaded sleeve connectors may be used. Moreover, other anchoring means than the plate connector shown in the drawing may be considered, as for example, the ends could be tied together.

I claim:

1. A convex tent comprising:
   a plurality of spaced apart elongated resilient primary members, each of said primary members being anchored at the ends thereof and bowed therebetween, the top ends of said primary members including bent tips, said primary members substantially determining the width and the height of said tent;
   a plurality of elongated bowed resilient auxiliary members, each of said auxiliary members being fixedly and angularly associated with and between a pair of said primary members;
   at least one top plate connector rigidly anchoring said top ends of said primary members, said plate connector including; an upper plate member having apertures therein, a lower plate member spaced from said upper plate member, said top ends positioned between said plate member with said bent tips thereof received within said apertures and securing means associated with said plate members for decreasing the distance between said plate members to cause the same to abut against said top ends of the primary members; and
   a flexible material contacting said resilient primary and auxiliary members and substantially covering the same, said primary and said auxiliary members co-operating with said material to form the curvature for said convex tent.

2. A convex tent as defined in claim 1, wherein each of said resilient primary and auxiliary members has a varying lateral cross-section to control the curvature of said tent when assembling the same.

3. A convex tent as defined in claim 1, wherein each of said resilient primary and auxiliary members is initially permanently bent in an arc to provide pre-control of the curvature of each and the resultant curvature of said tent.

4. A convex tent as defined in claim 1, wherein each of said resilient primary and auxiliary members are hollow.

5. A convex tent as defined in claim 1, wherein a plurality of sleeve connectors fixedly associate said auxiliary members at an angle with respect to said primary members, each of said sleeve connectors including a pair of transverse sleeves disposed on opposite sides of one of said primary members, each of said transverse sleeves including an opening communicating with the outside, opposed ends from adjacent said auxiliary members being received within the openings of said transverse sleeves, the resilient forces from said adjacent auxiliary members affording a firm frictional contact within the openings of said sleeves, the positioning of said ends within said transverse sleeves bracing said one primary member.

6. A convex tent as defined in claim 1, wherein a plurality of cross-sleeve connectors fixedly and angularly connect said auxiliary members between said primary members, each of said cross-sleeve connectors including: a hollow vertical sleeve to contain therein a portion of one of said primary members and a pair of transverse sleeves integrally formed to opposite sides of said vertical sleeve, each of said transverse sleeves having an opening communicating with the outside, opposed ends from adjacent said auxiliary members being received within the openings of said transverse sleeves and securing means fixedly connecting said vertical and transverse sleeves to said adjacent auxiliary members and said portion of said primary member.

7. A convex tent as defined in claim 6, wherein said securing means of each of the cross-sleeve connectors comprises:
   a pin member passing through said portion of the primary member and said vertical sleeve and fixedly connected to said vertical sleeve; and
   a spring means rigidly associated with said sleeves and resiliently biased within communicating apertures of said ends of the adjacent auxiliary members and said transverse sleeves to fixedly associate the same together.

8. A convex tent as defined in claim 6, wherein said bottom ends of said primary members are rigidly anchored to a common lower surface.

9. A convex tent as defined in claim 6, wherein the bottom ends of said primary members are rigidly connected to a plurality of spaced apart bottom plate connectors and a substantially straight stake is connected between at least two of said bottom plate connectors and a common lower surface.

10. A convex tent as defined in claim 6, wherein said resilient members include sections and coupling means connecting adjacent said sections of one of said resilient members, said coupling means comprising:
    a collar having hollow portions at the extreme ends thereof, said hollow portions communicating with the outside and receiving therein opposed ends from said adjacent sections;
    a fastening means for fixedly connecting said sections to said collar, said fastening means including a resilient means secured to said collar and resiliently biased within communicating apertures of said collar and at least one of sections to secure said one section to said collar.

11. A convex tent comprising:
    a plurality of spaced apart resilient primary members, each of said primary members including a bottom end anchored to a common lower surface and a top end, said primary members substantially determining the width and the height of said tent;
    a plurality of elongated bowed resilient auxiliary members, said auxiliary members being positioned angularly between said primary members;
    a top plate connector rigidly connecting said top ends of said primary members together;
    a plurality of sleeve connectors fixedly associating said auxiliary members at an angle with respect to said primary members, each of said sleeve connectors including: a hollow vertical sleeve to contain therein a portion of one of said primary members and a pair of transverse sleeves disposed on opposite sides of said one primary member, each of said transverse sleeves including an opening communicating with the outside, opposed ends from adjacent said auxiliary members being received within the openings of said transverse sleeve, and securing means fixedly connecting said vertical sleeve and said pair of transverse sleeves to said adjacent auxiliary members and said one primary member; and
    a flexible material contacting said primary and auxiliary members and substantially covering the same, said material attached to said primary members, said primary and auxiliary members resiliently urging themselves against said material to afford a firm and tautly assembled tent and cooperating with said material to form the curvature for said convex tent.

12. A convex tent comprising:
    a plurality of spaced apart resilient bowed primary members, each of said primary members including at least two sections, said sections comprising a bottom end anchored to a common lower surface and a top end, said primary members substantially determining the width and the height of said tent;
    a plurality of elongated resilient auxiliary members fixedly and angularly associated with and between said primary members, each of said auxiliary members having a bowed portion between an upper and lower end, the bowed portions of each of said auxiliary members being fixedly and angularly associated with a bowed portion of an adjacent auxiliary member, at least one of said adjacent auxiliary members having a first section and a second section;
    a plurality of spaced apart top plate connectors, each of said top plate connections rigidly associating the top ends of the sections of one of said primary members with the said upper ends of adjacent auxiliary members;
    a plurality of spaced apart bottom plate connectors, each of said bottom plate connectors rigidly attaching the lower ends of adjacent auxiliary members with the lower part of a primary member;
    a cross-sleeve connecting means fixedly associating said adjacent auxiliary members together, said cross-sleeve connecting means including a vertical sleeve with hollow parts at the ends thereof exposed to the outside and a pair of transverse sleeves integrally formed to and positioned on opposite sides of said vertical sleeve, each of said transverse sleeves including openings communicating with the outside, opposed ends of said first and said second section of said one adjacent auxiliary member being received within said openings, said hollow parts of the vertical sleeve containing a portion of the other of said adjacent auxiliary members and securing means for fixedly connecting said vertical and transverse sleeves to said adjacent auxiliary members to brace the bowed portions of each together; and
    a flexible material contacting said primary and auxiliary members and substantially covering the same, said material attached to said primary members, said primary and auxiliary members resiliently urging themselves against said material to afford a firm and tautly assembled tent and cooperating with said material to form the curvature for said convex tent.

References Cited by the Examiner

UNITED STATES PATENTS

| | | | |
|---|---|---|---|
| 2,144,747 | 1/1939 | Adams. | |
| 2,266,853 | 12/1941 | Dabney | 135—5 |
| 2,705,928 | 4/1955 | Pont | 135—1 X |
| 2,823,683 | 2/1958 | Smith et al. | 135—3 |
| 2,948,287 | 8/1960 | Rupert | 135—1 X |
| 2,953,145 | 9/1960 | Moss et al. | 135—1 |
| 3,039,478 | 6/1962 | Timmons | 135—3 |
| 3,051,185 | 8/1962 | Reynolds | 135—3 |
| 3,052,251 | 9/1962 | De Jean | 135—5 |

FOREIGN PATENTS

| | | |
|---|---|---|
| 1,241,963 | 8/1960 | France. |
| 760,960 | 11/1956 | Great Britain. |
| 839,335 | 6/1960 | Great Britain. |

HARRISON R. MOSELEY, *Primary Examiner.*

REINALDO P. MACHADO, *Examiner.*

C. S. KAIMAN, L. J. SANTISI, *Assistant Examiners.*